(12) United States Patent
Kirazci et al.

(10) Patent No.: US 10,402,432 B1
(45) Date of Patent: Sep. 3, 2019

(54) SEARCH SUGGESTIONS BASED ON NATIVE APPLICATION HISTORY

(71) Applicant: Google LLC, Mountain View, CA (US)

(72) Inventors: Ulas Kirazci, Mountain View, CA (US); Othar Hansson, Sunnyvale, CA (US); Anton Hansson, London (GB)

(73) Assignee: Google LLC, Mountain View, CA (US)

( * ) Notice: Subject to any disclaimer, the term of this patent is extended or adjusted under 35 U.S.C. 154(b) by 5 days.

(21) Appl. No.: 15/860,409

(22) Filed: Jan. 2, 2018

Related U.S. Application Data

(63) Continuation of application No. 14/747,956, filed on Jun. 23, 2015, now Pat. No. 9,892,190.

(60) Provisional application No. 62/017,242, filed on Jun. 25, 2014.

(51) Int. Cl.
  *G06F 17/30* (2006.01)
  *G06F 16/332* (2019.01)

(52) U.S. Cl.
  CPC .................. *G06F 16/3322* (2019.01)

(58) Field of Classification Search
  CPC .................................................. G06F 16/3322
  USPC .................................................. 707/600–899
  See application file for complete search history.

(56) References Cited

U.S. PATENT DOCUMENTS

| 7,617,225 | B2 | 11/2009 | Arrouye |
| 8,086,957 | B2 | 12/2011 | Bauchot |
| 8,458,384 | B2 | 6/2013 | Johnson |
| 8,510,764 | B1 | 8/2013 | Deselaers |
| 8,515,979 | B2 | 8/2013 | Mehta |
| 8,554,345 | B2 | 10/2013 | Fernandez |
| 8,595,450 | B2 | 11/2013 | Nguyen |
| 2004/0030882 | A1 | 2/2004 | Forman |
| 2007/0209080 | A1 | 9/2007 | Ture |
| 2010/0257466 | A1 | 10/2010 | Wroblewski |
| 2010/0306191 | A1 | 12/2010 | LeBeau |
| 2011/0055189 | A1 | 3/2011 | Effrat |
| 2011/0252038 | A1 | 10/2011 | Schmidt |
| 2011/0314004 | A1 | 12/2011 | Mehta |
| 2012/0124061 | A1 | 5/2012 | Macbeth et al. |
| 2012/0179706 | A1 | 7/2012 | Hobbs |
| 2012/0179955 | A1 | 7/2012 | French |
| 2012/0290584 | A1 | 11/2012 | De |
| 2012/0316955 | A1 | 12/2012 | Panguluri et al. |
| 2012/0323898 | A1 | 12/2012 | Kumar |
| 2013/0006897 | A1 | 1/2013 | Jain |
| 2013/0110815 | A1 | 5/2013 | Tankovich |
| 2013/0111328 | A1 | 5/2013 | Khanna |

(Continued)

FOREIGN PATENT DOCUMENTS

| EP | 2474905 | 7/2012 |
| EP | 2495670 | 9/2012 |

OTHER PUBLICATIONS

"Adding deep linking to Google+ posts shared from your iOS app," [online] [Retrieved on Jan. 7, 2014]; Retrieved from the Internet URL: https://developers.google.com/+/mobile/ios/shar/deep-link; 3 pages.

(Continued)

*Primary Examiner* — Isaac M Woo
(74) *Attorney, Agent, or Firm* — Fish & Richardson P.C.

(57) ABSTRACT

Methods, systems, and apparatus, for automatically generating search suggestions based on history data for multiple native application on a user device.

13 Claims, 4 Drawing Sheets

(56) References Cited

U.S. PATENT DOCUMENTS

| | | | |
|---|---|---|---|
| 2013/0122861 A1 | 5/2013 | Kim | |
| 2013/0124606 A1 | 5/2013 | Carpenter | |
| 2013/0191360 A1 | 7/2013 | Burkard | |
| 2013/0232256 A1 | 9/2013 | Lee | |
| 2013/0298007 A1 | 11/2013 | Cullen | |
| 2013/0325856 A1 | 12/2013 | Soto | |
| 2014/0172562 A1* | 6/2014 | Weatherford | G06Q 30/0256 705/14.54 |

OTHER PUBLICATIONS

"App Linking," [online] [Retrieved on Jan. 7, 2014]; Retrieved from the Internet URL: https://developers.facebook.com/docs/android/link-to-your-native-app/; 14 pages.

"Class Gecko View Content," [online] [Retrieved on Jan. 2, 2014]; Retrieved from the Internet URL: people.mozilla org/~mfinkle/geckoview/docs/org/Mozilla/gecko/GeckoViewContent.html; 4 pages.

"Deeplink.me Lets Mobile Users Navigate Through a "Web" of Apps," [online] [Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online] [Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online] [Retrieved on Dec. 13, 2013]; Retrieved from the Internet URL: techcrunch.com/2013/10/31/android-4-4-kitkat-app-indexing/; 6 pages.

"How to determine when an application is fully launched?" [online] [Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online] [Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online] [Retrieved on Dec. 16, 2013]; Retrieved from the Internet URL: chrome.blogspot.jp/2011/08/instant-pages-on-google-chrome.html; 3 pages.

"Mobile deep linking," [online] [Retrieved on Dec. 13, 2013]; Retrieved from the Internet URL: en.wikipedia.org/wiki/Mobile_deep_linking; 2 pages.

"NSApplication Class Reference," [online] [Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online] [Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online] [Retrieved on Jan. 7, 2014]; Retrieved from the Internet URL: https://developers.google.com/+/mobile/android/share/#handling_incoming_deep_links; 2 pages.

* cited by examiner

SEARCH SUGGESTIONS BASED ON NATIVE APPLICATION HISTORY

CLAIM OF PRIORITY

This application is a continuation application of, and claims priority to, U.S. patent application Ser. No. 14/747,956, titled "Search Suggestions Based on Native Application History," filed on Jun. 23, 2015, which application claims priority under 35 USC § 119(e) to U.S. Patent Application Ser. No. 62/017,242, filed on Jun. 25, 2014. The entire contents of each application are hereby incorporated by reference.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular web page resources accessible over the Internet. With the advent of tablet computers and smart phones, native applications that facilitate the performance of the same functions facilitated by the use of web page resources are now being provided in large numbers. Thus, many users are now using native applications for specific websites instead of the classic browser application that so many are familiar with.

Search systems provide search suggestions to users to help users satisfy their informational needs. For example, in response to a user entering the search query "cricket," a search system may suggest "India South Africa Series" as a query suggestion. As used herein, the term "query suggestion" is a suggested data that can be used to refine a search or refine a search strategy. Typically, query suggestions are generated from history data collected from a particular application, such as a web browser application.

SUMMARY

The present disclosure relates to app deep linking, and more specifically to systems and methods for centralizing the tracking of in-app history, and ranking and serving based on a search that includes deep links.

In general, one innovative aspect of the subject matter described in this specification can be embodied in methods that include the actions of receiving, from a first user device, a search query input for a search interface in a browser application, the search interface being an interface in which a user can input a search query and receive search results from a search service, the search query input comprising one or more characters; accessing native application history data for the first user device, the native application history data describing content presented by a plurality of native applications at the first user device, each of the plurality of native applications being different from the search application, and each native application being an application that operates independent of the browser application and the native application history data being independent of history data of the browser application; generating, based on the search query input and the native application history data for the first user device, one or more query suggestions; and providing, to the first user device, the one or more query suggestion for presentation in the search environment of the search application. Other embodiments of this aspect include corresponding systems, apparatus, and computer programs, configured to perform the actions of the methods, encoded on computer storage devices.

Another innovative aspect of the subject matter described in this specification can be embodied in methods that include the actions of generating, at a first user device, native application history data describing content presented by a plurality of native applications at the first user device, each of the plurality of native applications being different from a search application; receiving as input, at the first user device, a search query input in a search environment of a search application, the search application being a native application that provides the search environment in which the user can input a search query and receive search results from a search service; sending, to the search service, the search query at the native application history data; receiving one or more query suggestions from the search service and based on the search query input and the native application history data for the first user device; and displaying, at the first user device, the one or more search suggestions. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system allows a search service to utilize browsing history from multiple different native applications to provide search suggestions, when the browsing history would not otherwise be available. In particular, the use of native applications for specific websites reduces the actual "browser history" for a browser, as the browser application is not being used. The embodiments of the subject matter described in this specification overcome this limitation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
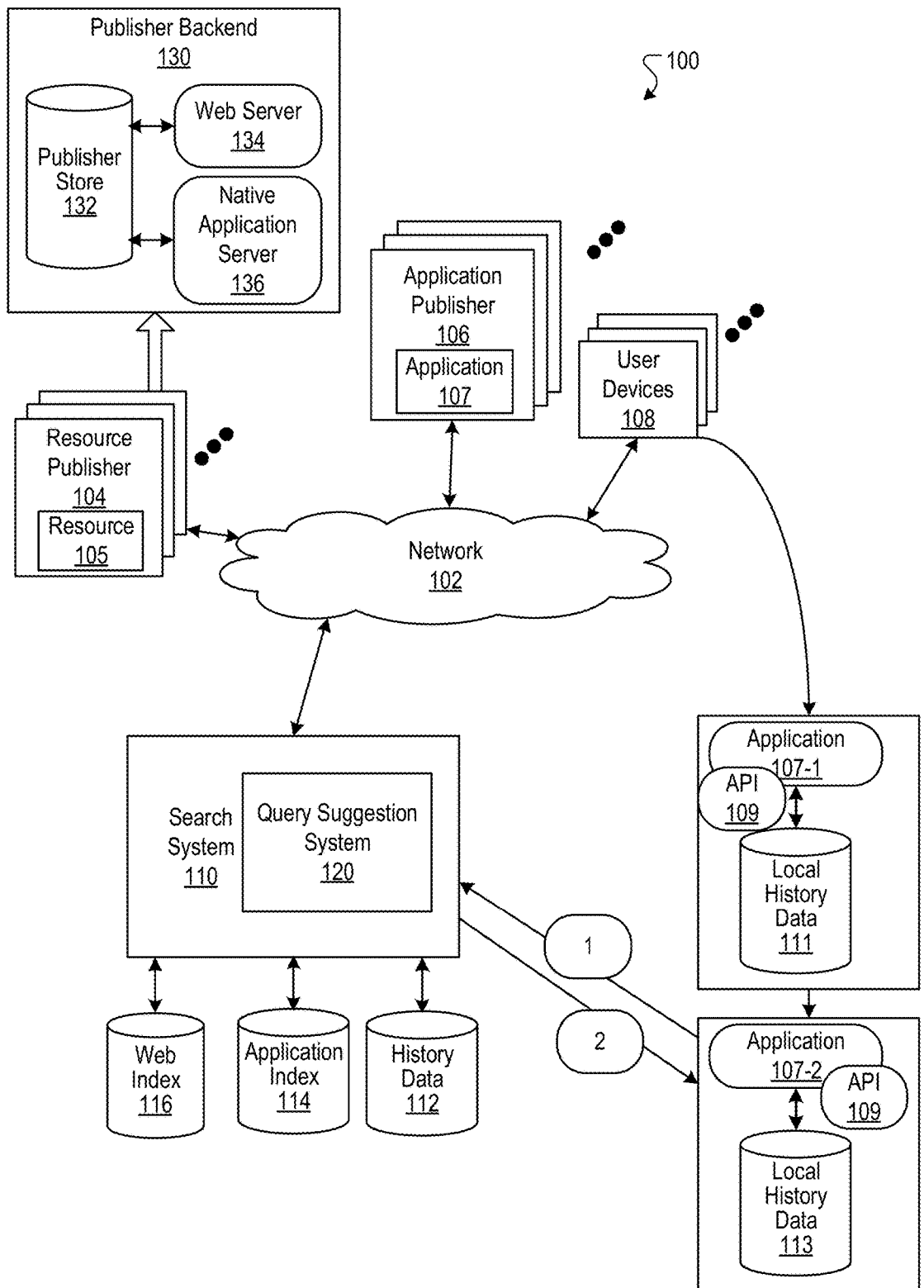
FIG. 1 is a block diagram of an example environment in which search suggestions based on native application history data are generated.

A system provides search suggestions based on native application browsing history from multiple native applications. As used herein, a native application operates independent of a browser application on the user device. A native application is an application specifically designed to run on a particular user device operating system and machine firmware and not within a browser. Native applications thus differ from browsers, browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific as are native applications. Furthermore, as used herein, a native application search result is a search result that corresponds to a particular native application and that, when selected, invokes the particular native application.

Examples of native applications include applications to create text documents, edit photographs, play music, interface with a remote banking system, and so on. Mobile native applications are designed to operate on mobile devices such as smart phones, tablets, and so on. Web native applications are designed to run within (both visually and functionally) web browser software. At a very high level, native applications, or simply "apps," provide a user with access to content and/or functionality.

Internet search engines provide the ability to search an indexed collection of web pages that exist on the Internet. The typical search engine provides, in response to a query, a list of results relevant to the query, often with hyperlinks allowing a user to quickly navigate to a result of interest. A user may select a linked result and thereby be provided with a web page(s) containing content about a celebrity, product, business, etc. The links may be to a site's "home page" (e.g., a welcome and search page for a site aggregating cooking information such as recipes) or may be a "content page" that a user can access when navigating from a site's home page (e.g., a specific recipe at the cooking information site). Links to content pages, as opposed to home pages, are referred to as "deep links" (and the process for crawling, indexing, and serving these content pages is similarly referred to as "deep linking").

The ability to navigate to a page, as well as the accessibility of content and functionality that that page provides, is dictated in part by the nature of the published page. For example, certain pages may contain dynamic content (e.g., asynchronous java script and XML (AJAX), Adobe Flash, etc.) that are difficult or impossible to crawl and retrieve. Consequently, these pages may not be available in response to a search, a user may not be able to save the page as a bookmark or the like, and page navigation via browser controls (e.g., forward and back in history) may not operate as intended.

In certain instances, a search for documents may currently be performed "within an app" (a native application), or a browser for content specific to the native application. For instance, when properly configured to process a uniform resource identifier (URI), a browser (or native application) may launch a native application and present to a user a specific content page within the native application. Web browsers record URL search history and re-surface it on demand or in action prediction, and can also use that history to improve ranking for future searches. However, this only works for web pages. Search queries and search clicks can also be resurfaced but this does not include browsed native application content. However, unlike a browser's process of search history for URLs, browsers are not able to capture browse history inside a native application. This means that a browser is not able to re-surface native application browse history. This also prevents a browser or search service provider from using in-app browse history to improve ranking and predictive services.

According to the present disclosure, a system and method provides for reporting, tracking, indexing, and serving of in-app views. According to one embodiment, an API is provided for this process.

Upon browsing within a native application, the native application calls an API to report content view—native applications call an API that is exposed by a service. The service is always running or started up on-demand to receive the API call.

An indexer stores and indexes the titles of the viewed content, and the titles are indexed. In some implementations, the data may be stored at the user device. In other implementations, the data may be provided to a search system for storage. In variations of this implementation, the data is provided periodically so as not to establish unnecessary communication and to conserve battery power. For example, the data may be provided with a search query input, or may be provided when any native application communicates over a network for some other reason.

Upon search, a suggest service retrieves and ranks the reported history. The indexed data is surfaced through queries from a search interface (which can be a known search interface such as that provided by Google Inc.) Ranking of query suggestions may take into account browse and search history of a given piece of content (e.g., same recipe from a given cooking information native application).

The search logs may be anonymized to determine relative ranking of reported history. Each native application may have a different utility for recalling its browse history. History from each native application may be "blended" with that from other native applications, as well as other sources such as web search query auto-completions.

Anonymized logs may be provided to detect and demote spammers. Unlike web history, where the browser is a trusted first-party application, native application history is reported from a variety of native applications from a variety of sources. Many native applications have a relatively high referral from search and suggest clicks, which may provide an incentive to spam the results. In some implementations, spamming may be prevented in two ways:

(a) A rate-limit on volume of total data that can be pushed from a given native application; and (b) Analysis of aggregate click-through rates (CTR) of native application sources.

Method (a), above, prevents native applications from causing system issues for the mobile device such as filling up a disk, causing excessive network traffic, etc. Method (b) identifies native applications that have poor utility and demote them in ranking (or blacklist them completely).

Thus, subject matter implementing this disclosure provides, by way of example,

1) A centralized API to report browsing history rather than querying each native application for its history;

2) An on-device indexer that can efficiently ingest and serve the data (low CPU/battery/RAM/network usage), even though it is often running;

3) Data ranking, based on efficient collection of clicks within native applications;

4) Ability to identify and segregate/down-rate/block spam or low quality sources, based on click-through rate; and 5) Native application-specific history, ranking and serving.

FIG. 1 is a block diagram of an example environment 100 in which search suggestions based on native application history data are generated. A computer network 102, such as the Internet, connects resource publisher web sites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. A native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

An application page is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device.

Some publishers 104 and 106 may be the same, and provide the same content in both web resources and native applications. The management of the delivery of such content is handled by a publisher backend 130. The publisher backend 130 includes a publisher store 132 that stores content the publisher provides, a web server 134 that provides the content from the publisher store as web resources (e.g., web pages), and a native application server 136 that handles requests from a native application. The web pages correspond to native application pages, and thus for many native application URIs there are corresponding web page URIs. Some native applications may also simply use the same URLs as the web pages to which they correspond. The content of the publisher store 132 is accessible for presentation on both the web resources and the corresponding native application pages. Accordingly, such content is referred to as "synchronized" content.

Thus, some users may not access publisher content in a web browser, but may instead use a native application provided by the publisher. Examples of such publishers and publisher native applications are news publishers, which may have a "mobile news app" for reading news content on a mobile device. The news content (e.g., the text of news story) provided on web resources 105 are the same content that is provided by the corresponding application pages of the native application 107.

A user device 108 is an electronic device that is capable of requesting and receiving web page resources 105 and native applications 107 over the network 102. Example user devices 108 include personal computers, mobile communication devices, and tablet computers.

The web index 116 is an index of publisher content that has, for example, been built from crawling the publisher web sites 104, by receiving data feeds from the publisher websites 104, or by other appropriate methods of collecting and indexing data.

The native application index 114 stores data relating to native applications 107. The application index 114 stores, for example, a list of native applications provided by the publishers 104 and identifiers that identify the native applications. Furthermore, in some implementations, publishers 104 may specify that certain native applications 107 are used to access and display synchronized data, and this information may be stored in the application index. For example, a news publisher may specify that a news reading application it provides displays synchronized content that is displayed on the news publisher's website.

The search system 110 includes a query suggestion subsystem 120. The query suggestions subsystem provides query suggestions that are related to a search query input by a user and also related to history data 112. The history data 112 includes native application history data describing content presented by many native applications at user devices. Each of the native applications is different from a search application. For example, the native applications may include news application, restaurant review applications, maps applications, and other such native applications.

As users use these native applications, the native applications report the user's browsing history on the user device. For example, in FIG. 1, the native application 107-1 accesses an API 109 and uses an API call to store browsing history in local history data 111. For example, an OS developer may provide a library for use on the operating system on the user device so that all native application developers can access the API and provide history data in a consistent format across all native applications.

At a later time, using another application, e.g., application 107-2, which may be a web browser with a search page open or a search native application, the user device submit a search query to the search engine 110, as indicated by flow element 1. In some implementations, the search engine 110, by use of the suggestion system, will provide query suggestions, as indicated by flow element 2. The query suggestions may be provided with search results, or, alternatively, may be provided as the user is typing in the query and before search results are provided. The generation of query suggestions and the types of query suggestions are described in more detail with reference to FIGS. 2, 3 and 4 below.

In response to a complete query, the search engine 110 accesses the web index 116 and the application index 114 to identify content that is relevant to the query. The search engine 110 may, for example, identify the resources and applications in the form of web resource search results and native application search results, respectively, by use of a search result generator 116. Once generated, the search results are provided to the user device 108 from which the query was received.

A web resource search result is data generated by the search engine 110 that identifies a web resource, based on the content of the resource that satisfies a particular search query. A web resource search result for a resource can include a web page title, a snippet of text extracted from the resource, and a uniform resource identifier (URI) for the resource, e.g., the uniform resource locator (URL) of the web page. When selected at a user device, the web resource search result causes the user device to generate a request for the resource located at the URL. The web resource that is received is then displayed in a browser application.

A native application search result specifies a native application and is generated in response to a search of the application index 114 and the web index 116, as described in more detail below. When selected at a user device, the native application search result causes the native application installed on the user device to request the synchronized content. Once the native application receives the requested content, the native application displays the content in a user interface of the native application.

Figure 2:
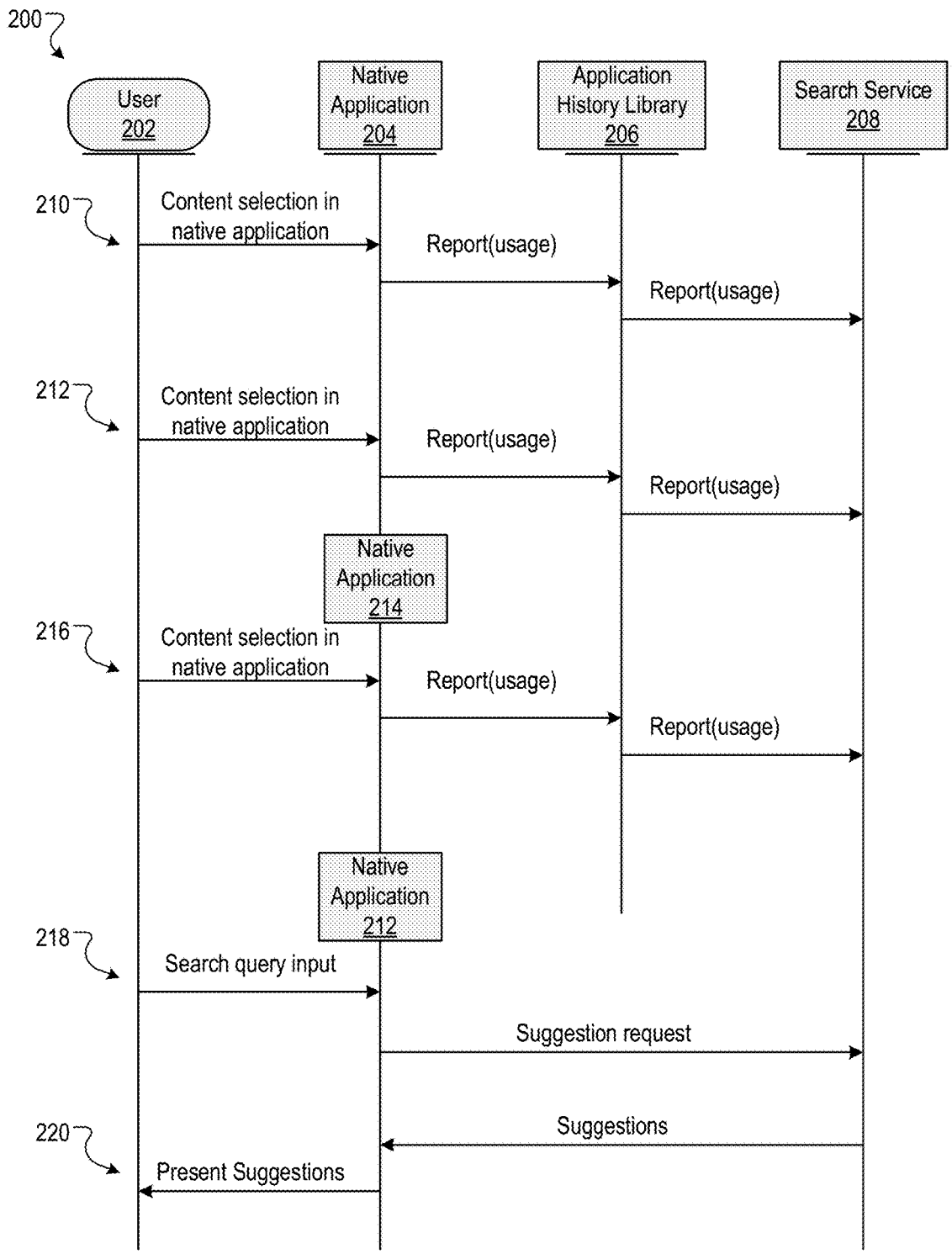
FIG. 2 is a timeline depicting communications between a user device and a search system, and the providing of search suggestions based on native application history data.

FIG. 2 is a timeline 200 depicting communications between a user device and a search system, and the providing of search suggestions based on native application history data. At the beginning of the time line, a user 202 has launched a native application 204 on a user device. An application history library 206 is installed on the user device, which is provided by an OS publisher to simplify integration for native applications. A search service 208, such as service provided by the search system 110, can receive data from the user device and provide data to the user device.

At the time 210, the user 202 selects content in the native application 204. In response, the native application 204, utilizing the library 206, reports the usages. The usage is reported in a standard format for all native applications, e.g., the message may include a usage type e.g., browsed after a selection, a search in the native application, etc.; the URI of the content; document body information, such as content; and an abstract, which characterizes the action. For example, assume the native application is a restaurant rating application, and the user is searching for Thai restaurants. The usage report may be:

{
usageType=searched;
URI=<example.app1.URI>;
document body=<unspecified>
abstract=<query="thai restaurants">
}

This information may be stored in the local history data 111 by the library 206 (or, alternatively, provided to the search service 208 in response to the query). The user may issue other queries, or perhaps select a restaurant listing. For example, assume at time 212 the user selects a restaurant listing. The reporting message may be:

{
usageType=browsed;
URI=<example.app1.URI>;
document body=<unspecified>
abstract=<unspecified>
}

Suppose at time 216, the user opens another native application 214, and reads a restaurant review. The reporting message may be:

{
usageType=browsed;
URI=<example.app2.URI>;
document body=<unspecified>
abstract=<unspecified>
}

Later, at time 218, the user has opened a search application, e.g., native application 218 (or, alternatively, a browser and navigated to a search web page for the search system 110). The user inputs a search query input. In response, the native application 218 provides the query input to the search service 208 in the form of a suggestion request. If the local history data 111 has not yet been provided to the search service 208, then it is provided with the search query input. The search service 208 processes the search history data, the query input, and optionally the history data 112 for other user devices, and provides query suggestions to user device, where the native application 212 presents the suggestions to the user 202.

Thus, by use of the library 206, browsing and search data for multiple different native applications that would not otherwise be available to the search service 208 can now be used.

Figure 3:
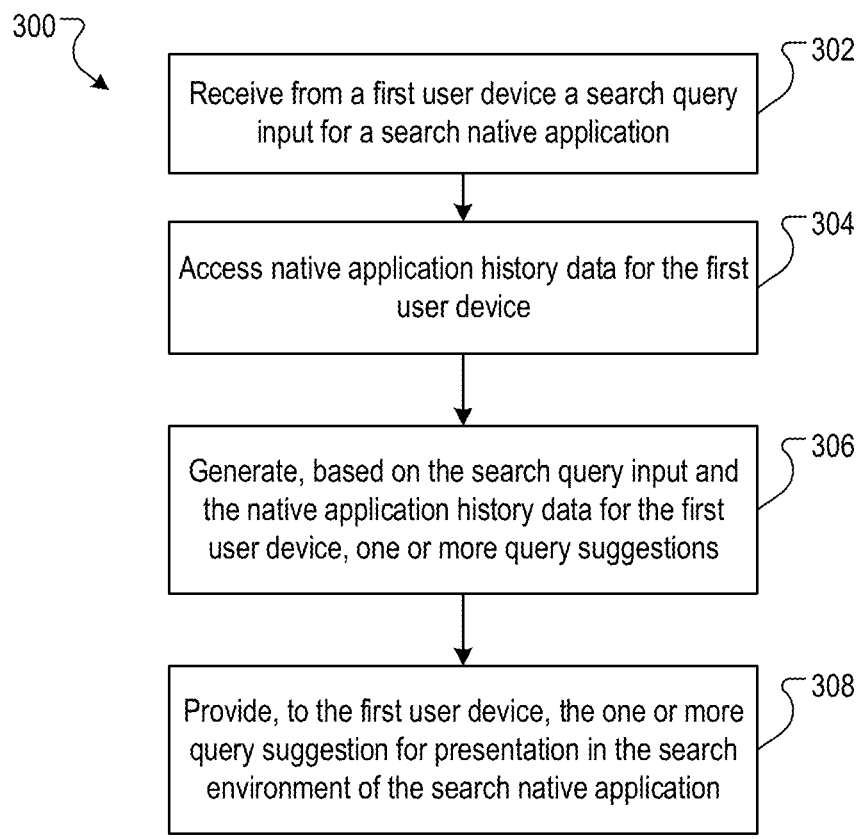
FIG. 3 is a flow diagram of an example process for providing search suggestions based on native application history data.

FIG. 3 is a flow diagram of an example process 300 for providing search suggestions based on native application history data. The process 300 can be implemented, for example, in computers of the search system 110.

The process 300 receives, from a first user device, a search query input for a search native application (302). The search query input is for a search application that provides a search environment in which a user can input a search query and receive search results from a search service, the search query input comprising one or more characters.

The process 300 accesses native application history data for the first user device (304). The native application history data describes content presented by a different native application at the first user device, each of which may be different from the search application. Of course, history data for the search application can also be provided. The native application history data may be provided from the first user device with the query, or may have been provided by another native application.

The process 300 generates, based on the search query input and the native application history data for the first user device, one or more query suggestions (306). Of course, native application history data 112 for other user devices can also be considered. By doing so, popular query suggestions that appeal to a larger group may also be identified. A variety of known query suggestion algorithms can be used.

The process 300 provides, to the first user device, the one or more query suggestion for presentation in the search environment of the search native application (308). The user can select one of the suggestions, or ignore them. In some implementations, the suggestions may include native application search suggestion that, when selected, causes a second native application other than the search application to launch and display content described by the native application search suggestion. For example, the native application search suggestion may include a deep link to the second native application. To illustrate, assume the query input was "th". Based on the history 111 and 112, the query suggestions "Thai Restaurant" and "Thai Restaurant—Restaurant Rating Review App" is generated. The latter suggestion is a native application suggestion that includes a deep link to, for example, the native application 204 and that, when selected, launches the native application 204 (the restaurant rating application) with the query "Thai restaurant." Thus, by selecting the suggestion, the user may be taken to a user environment for which the user's behavior from the time period from 210 to 216 expressed satisfaction of an informational need.

To prevent abuse by users or bots, the suggestion system 120 can implement abuse safeguards. For example, the suggestion system 120 may have a history rate limit that limits an amount of history data provided by the user device over time. This prevents a user or bot from inflating ratings, selections, or statistics that can be used to determine popularity. When the amount of history data received over a period of time exceeds the rate limit, the suggestion system 120 caps the amount of history data received from the user device so as the amount of history does not exceed the rate limit. For example, the suggestion system 120 may ignore further reports for a period of time until the amount received is again less than the rate limit.

By way of another example, the suggestion system 120 may determine, for a particular native application on a user device, a history rate limit that limits an amount of history data provided by the native application over time. This is similar to the rate limit above but is specific to a native application. When the amount of history data received for the native application on the user device over a period of time exceeds the rate limit, the search system 110 caps the amount of history data received for the native application on the user device as described above.

By way of another example, the suggestion system 120 may have a selection rate limit for content (e.g., a resource page, an app, etc.). When the history data 112 indicates the selection rate for the particular resource exceeds a selection rate limit, the suggestion system 120 demotes query suggestions that identify the particular resource.

Figure 4:
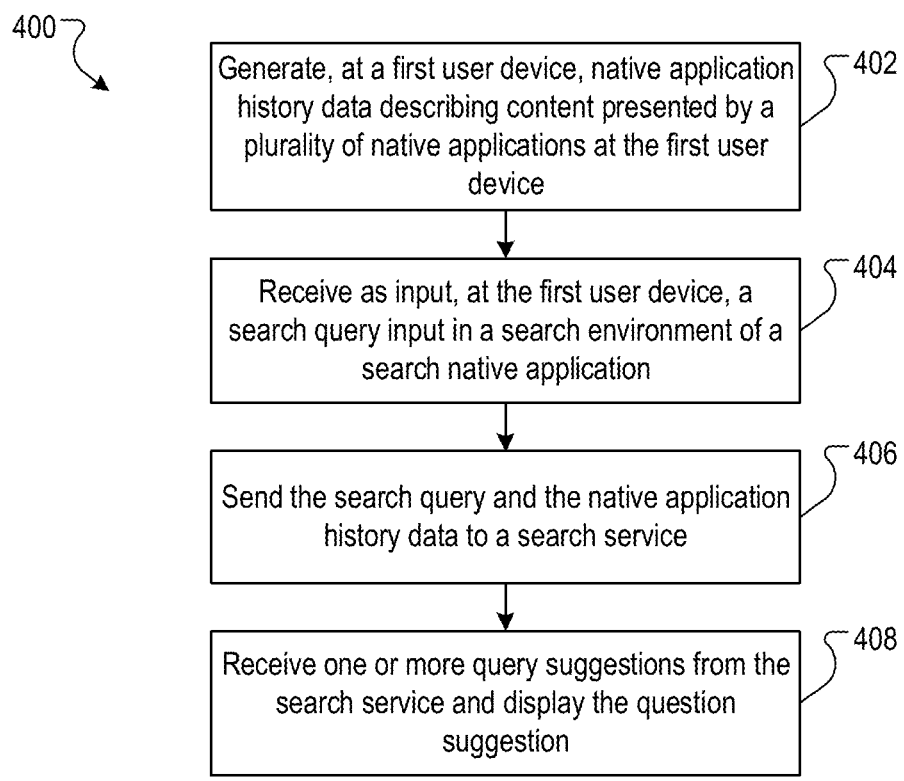
FIG. 4 is a flow diagram of another example process for receiving search suggestions based on native application history data.

FIG. 4 is a flow diagram of another example process 400 for receiving search suggestions based on native application history data. The process 400 can be implemented, for example, in a user device 108.

The process 400 generates, at a first user device, native application history data describing content presented by a plurality of native applications at the first user device (402). The history data can be generated from the reporting data described above, e.g., from multiple native applications at the first user device that each executing API call to a service on the first user device that collects history data describing the content presented by the native application. For example, titles, URIs, and actions take can be indexed.

The process 400 receives as input, at the first user device, a search query input in a search environment of a search native application (404). For example, the user enters the partial query "th".

The process 400 sends the search query and the native application history data to a search service (406). The partial query "th" is sent to the search service 208, as well as the native application history data 111.

The process 400 receives one or more query suggestions from the search service and display the question suggestion (408). For example, the suggestions as described above are received and displayed.

In some implementations, the user device 108 may also have a "pull API" so that the search system 110 can pull the history data 111 from the user device at certain times.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
   receiving, from a first user device, a search query input for a search interface in a browser application, the search interface being an interface in which a user can input a search query and receive search results from a search service, the search query input comprising one or more characters;
   receiving, from the first user device and for each of a plurality of native applications on the first user device, native application history data that describes content presented by the native application at the first user device, each of the plurality of native applications being different from the browser application, and each native application being an application that operates independent of the browser application and the native application history data being independent of history data of the browser application;

generating, based on the search query input and the native application history data for the first user device, one or more query suggestions; and providing, to the first user device, the one or more query suggestion for presentation in the search environment of the browser application;

wherein at least one of the search suggestions is a native application search suggestion for a native application on the first user device that, when selected, causes the native application to launch and display content described by the native application search suggestion, wherein the content displayed is content that was previously presented by the native application on the first user device.

2. The computer-implemented method of claim 1, further comprising:

accessing native application history data for a plurality of user devices that include user devices other than the first user device; and wherein generating one or more query suggestions comprises generating the one or more query suggestions based on the search query input, the native application history data for the first user device, and the native application history data for the plurality of user devices.

3. The computer-implemented method of claim 1, wherein receiving, from the first user device, the search query input includes receiving, from the first user device, the native application history data from the first user device.

4. The computer-implemented method of claim 1, further comprising:

determining, for a particular user device, a history rate limit that limits an amount of history data provided by the user device over time; and when the amount of history data received over a period of time exceeds the rate limit, capping the amount of history data received from the user device so as the amount of history does not exceed the rate limit.

5. The computer-implemented method of claim 1, further comprising:

determining, for a particular resource and based on the native application history data for a plurality of user devices, a selection rate for the particular resource; and when the selection rate for the particular resource exceeds a selection rate limit, demoting query suggestions that identify the particular resource.

6. The computer-implemented method of claim 1, wherein the native application search suggestion includes a deep link to the second native application.

7. A system, comprising:

a data processing apparatus; and software stored in non-transitory computer readable storage medium storing instructions executable by the data processing apparatus and that upon such execution cause the data processing apparatus to perform operations comprising:

receiving, from a first user device, a search query input for a search interface in a browser application, the search interface being an interface in which a user can input a search query and receive search results from a search service, the search query input comprising one or more characters;

receiving, from the first user device and for each of a plurality of native applications on the first user device, native application history data that describes content presented by the native application at the first user device, each of the plurality of native applications being different from the browser application, and each native application being an application that operates independent of the browser application and the native application history data being independent of history data of the browser application;

generating, based on the search query input and the native application history data for the first user device, one or more query suggestions; and providing, to the first user device, the one or more query suggestion for presentation in the search environment of the browser application;

wherein at least one of the search suggestions is a native application search suggestion for a native application on the first user device that, when selected, causes the native application to launch and display content described by the native application search suggestion, wherein the content displayed is content that was previously presented by the native application on the first user device.

8. The system of claim 7, the operations further comprising:

accessing native application history data for a plurality of user devices that include user devices other than the first user device; and wherein generating one or more query suggestions comprises generating the one or more query suggestions based on the search query input, the native application history data for the first user device, and the native application history data for the plurality of user devices.

9. The system of claim 8, the operations further comprising:

determining, for a particular resource and based on the native application history data for a plurality of user devices, a selection rate for the particular resource; and when the selection rate for the particular resource exceeds a selection rate limit, demoting query suggestions that identify the particular resource.

10. The system of claim 7, wherein receiving, from the first user device, the search query input includes receiving, from the first user device, the native application history data from the first user device.

11. The system of claim 7, the operations further comprising:

determining, for a particular user device, a history rate limit that limits an amount of history data provided by the user device over time; and when the amount of history data received over a period of time exceeds the rate limit, capping the amount of history data received from the user device so as the amount of history does not exceed the rate limit.

12. The system of claim 7, wherein the native application search suggestion includes a deep link to the second native application.

13. A non-transitory computer readable storage medium storing instructions executable by the data processing apparatus and that upon such execution cause a data processing apparatus to perform operations comprising:

receiving, from a first user device, a search query input for a search interface in a browser application, the search interface being an interface in which a user can input a search query and receive search results from a search service, the search query input comprising one or more characters;

receiving, from the first user device and for each of a plurality of native applications on the first user device, native application history data that describes content presented by the native application at the first user device, each of the plurality of native applications being different from the browser application, and each native application being an application that operates independent of the browser application and the native application history data being independent of history data of the browser application;

generating, based on the search query input and the native application history data for the first user device, one or more query suggestions; and providing, to the first user device, the one or more query suggestion for presentation in the search environment of the browser application;

wherein at least one of the search suggestions is a native application search suggestion for a native application on the first user device that, when selected, causes the native application to launch and display content described by the native application search suggestion, wherein the content displayed is content that was previously presented by the native application on the first user device.

* * * * *